Nov. 24, 1964 L. P. DE GIVE 3,158,122
METHOD OF BRAZING ELECTRON TUBE COOLING FINS
Filed Sept. 15, 1960
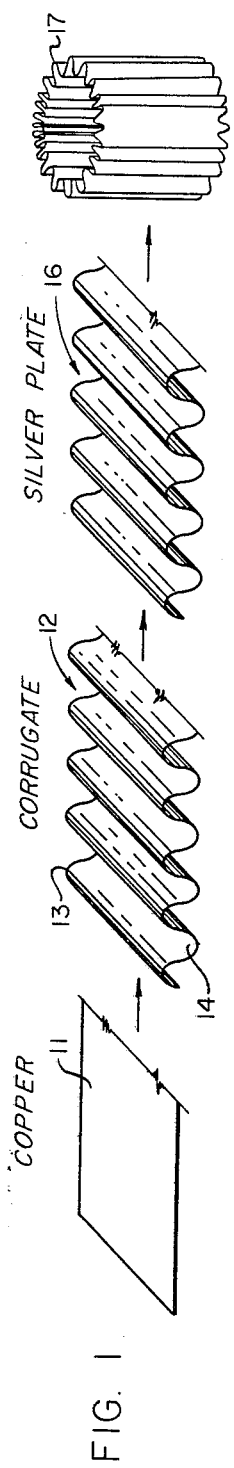
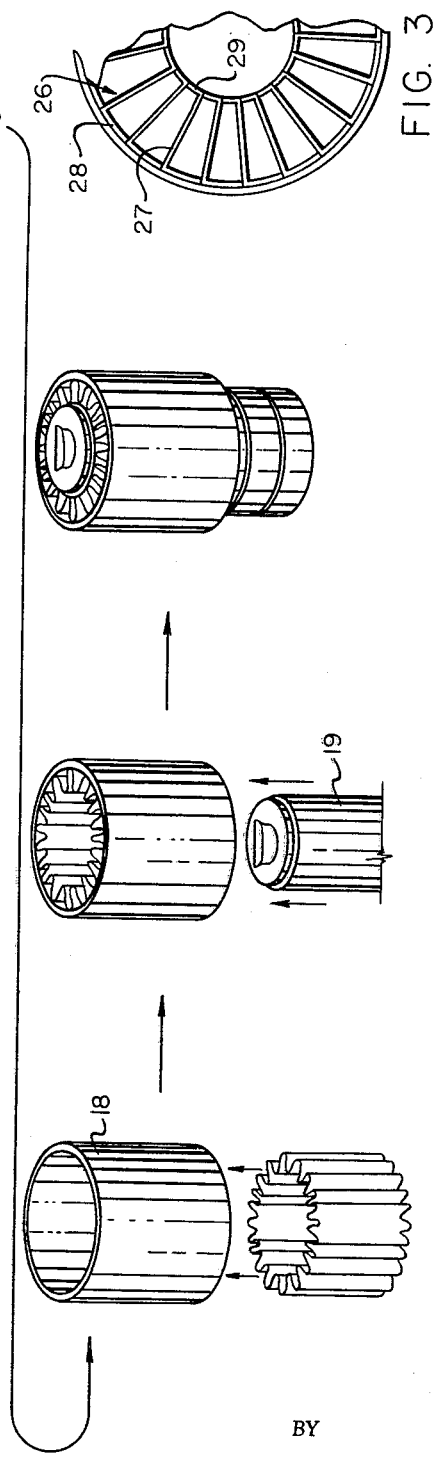
LOUIS P. de GIVE
INVENTOR
BY Leon F. Herbert
Robert W. Dilts
ATTORNEYS

United States Patent Office 3,158,122
Patented Nov. 24, 1964

3,158,122
METHOD OF BRAZING ELECTRON TUBE COOLING FINS
Louis P. de Give, Woodside, Calif., assignor to Eitel-McCullough, Inc., San Carlos, Calif., a corporation of California
Filed Sept. 15, 1960, Ser. No. 56,265
3 Claims. (Cl. 113—118)

This invention relates generally to electron tubes and more particularly to a method of brazing cooling fins to an external anode type electron tube.

Many power tubes having high anode dissipation employ a cooling fin structure to convey heat away from the anode. In general, such cooling fin structures comprise a plurality of fins which extend between the anode and a cylindrical outer shell. Typical of configurations are fins having a corrugated configuration and Z-shaped inserts. The fins are suitably brazed to the anode and to the outer shell to secure the parts together and provide good thermal conduction. The large surface area of the fins provides efficient removal of the heat conducted from the anode.

One method of applying fins in the prior art has been to place a corrugated strip of copper between the anode and shell with the outer ridges in physical contact with the shell and the inner ridges in physical contact with the anode. Thus, the corrugated material is essentially sandwiched between the shell and anode and in physical contact with each. A eutectic alloy ribbon or wire is placed between the outer ridges and the shell and a ribbon or a wire is placed between the inner ridges and the anode. A subsequent heating of the parts by placing them in a brazing furnace causes the eutectic mixture to melt and to flow along the contact points and braze the parts together.

A difficulty encountered in the prior art systems is that the material does not flow evenly along all of the contact points and that there may be a number of ridges, especially the inner ridges, which are not brazed to the adjacent anode structure. Thus, the efficiency of the cooling structure is reduced.

It is an object of the present invention to provide an improved method for forming and brazing a cooling fin assembly.

It is another object of the present invention to provide a method wherein the fins are efficiently and effectively brazed along all contact points.

It is a further object of the present invention to provide a brazing method in which the fin material is silver coated before sandwiching in the assembly and subsequent brazing causes the material to form a eutectic between the silver plate and adjacent metal portions to braze together the parts.

The foregoing and other objects of the present invention are, in general, achieved by employing a method which incorporates a silver plated copper cooling fin structure which is sandwiched between a copper shell and a copper anode and in which a subsequent heating causes the silver to form a eutectic with the adjacent copper, which eutectic melts and flows to the contact areas to braze the parts together.

The foregoing and other objects of the invention will be more clearly apparent from the following description when taken in conjunction with the accompanying drawings.

Referring to the drawing:

FIGURE 1 is a process flow sheet showing the forming of a cooling fin structure in accordance with the present invention;

FIGURE 2 shows a modification of the system shown in FIGURE 1; and

FIGURE 3 shows another cooling fin structure formed in accordance with the present invention.

Referring to FIGURE 1, the steps in forming a cooling fin structure are schematically illustrated. A copper sheet 11 is corrugated as shown at 12 to form a plurality of ridges 13 and grooves 14. The corrugated material may be formed from a ribbon of material of any length. The corrugated material is then silver plated 16. Subsequently, the silver plated material is cut into strips of predetermined length and folded into cylindrical shape 17 and placed in the cylindrical shell 18. The anode 19 is then inserted within the cylindrical opening. The dimensions of the corrugations, the cylindrical shell and the anode are such that when the anode is inserted within the assembly there is contact pressure between the inner ridges of the corrugations and the anode and the outer ridges of the corrugation and adjacent shell.

Subsequently, the complete assembly is placed in a brazing furnace to elevate its temperature. The brazing takes place substantially as follows: The interface of the silver-copper forms a thin layer of eutectic composition. This melts first and more silver and copper dissolves into the liquid phase as long as there is enough silver to maintain the eutectic composition. The eutectic then flows to the point of contact between the anode and inner ridges and the shell and outer ridges by capillary action.

It is observed that there is no need for the insertion of strips or wires of eutectic brazing material at the various juncture points to supply the necessary eutectic brazing alloy. Contact is effectively made along the whole surface and the eutectic easily flows to the contact points to form a good braze.

The foregoing was predicated upon corrugating the copper prior to silver plating. It is apparent, however, that the copper may be silver plated first and then corrugated and that the remainder of the steps wil be essentially the same as those described. The alternative steps are schematically illustrated in FIGURE 2.

The cooling fin structure in certain types of tubes is formed of a plurality of Z-shaped elements 26 which include a leg portion 27 and a plate portion 28 adapted to fit against the shell and a plate portion 29 adapted to fit against the anode. These Z-shaped inserts are placed in side by side relationship as shown in FIGURE 3. The assembly is then brazed. In accordance with the present invention, the various Z-shaped fins are silver plated prior to assembly between the shell and anode and a subsequent brazing operation will serve to form a competent braze between these members and the adjacent anode and cylinder.

The method described herein is superior to that followed in the prior art. The correct amount of brazing eutectic is assured where the metals are to be joined. Considering, by way of example, an electron tube in which the shell 18 is about one and one-half inches in diameter and three-quarters inch high, a silver plate having a thickness between two and four-ten thousandths of an inch forms a good joint when following the method of the present invention. To obtain an equivalent brazing by the prior art method, a like amount of copper-silver eutectic is necessary. Copper-silver alloy sheets between two and four-ten thousandths of an inch are difficult to obtain. Thus, in the prior art, a brazing ring having the same equivalent volume is employed. The brazing ring can easily be manufactured and handled. However, such a ring is relatively narrow and the eutectic must flow up and down the contacting portions to wet the complete length of the shell and adjacent fins, or anode and fins, as the case may be. Assuming that the ring is placed at the center of the shell, there must be flow up and down for at least a distance of three-quarters of an inch. If wider brazing rings are employed, there is excessive brazing material. The excess material may contaminate the remaining portions of the tube. This, in turn, results in having to re-work the tubes. According to the present method, the correct amount of brazing eutectic is present, resulting in a superior braze and minimized contamination.

I claim:

1. The method of forming a cooling fin structure which comprises forming a corrugated silver plated copper sheet, bending said sheet into cylindrical form and placing it into a cylindrical copper shell, urging a copper anode into the cylindrical opening defined by the corrugations so that the outer ridges of the corrugations are in physical contact with the shell and the inner ridges of the corrugations are in physical contact with the adjacent anode, raising the temperature of the assemblage to form a silver copper eutectic which flows to the contact areas, and subsequently cooling the assembly.

2. The method as in claim 1 wherein the corrugated silver plated copper sheet is formed by corrugating a copper sheet, and subsequently silver plating it.

3. A method as in claim 1 wherein the corrugated silver plated copper sheet is formed by silver plating a copper sheet, and subsequently corrugating the same.

References Cited in the file of this patent

UNITED STATES PATENTS

| | | |
|---|---|---|
| 1,677,714 | Frease | July 17, 1928 |
| 1,840,724 | Koehring | Jan. 12, 1932 |
| 2,641,731 | Lines | June 9, 1953 |
| 2,643,863 | Buschow | June 30, 1953 |
| 2,930,405 | Welsh | Mar. 29, 1960 |
| 3,005,036 | Mowatt | Oct. 17, 1961 |